US008694235B2

(12) United States Patent
Eadie

(10) Patent No.: US 8,694,235 B2
(45) Date of Patent: Apr. 8, 2014

(54) AIRCRAFT LOAD MANAGEMENT SYSTEM FOR INTERIOR LOADS

(75) Inventor: William J. Eadie, Cheshire, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 1392 days.

(21) Appl. No.: 12/280,691

(22) PCT Filed: Dec. 12, 2006

(86) PCT No.: PCT/US2006/061906
§ 371 (c)(1),
(2), (4) Date: Aug. 26, 2008

(87) PCT Pub. No.: WO2007/106191
PCT Pub. Date: Sep. 20, 2007

(65) Prior Publication Data
US 2009/0319165 A1    Dec. 24, 2009

Related U.S. Application Data

(60) Provisional application No. 60/777,660, filed on Feb. 27, 2006.

(51) Int. Cl.
G06F 17/10    (2006.01)
(52) U.S. Cl.
USPC .......................................................... 701/124
(58) Field of Classification Search
USPC ......... 701/3, 124; 244/118.1, 137.1; 414/373; 702/174; 700/214, 217, 226
See application file for complete search history.

(56) References Cited

U.S. PATENT DOCUMENTS

| 3,635,426 | A | 1/1972 | Stanley |
| 5,927,648 | A | 7/1999 | Woodland |
| 5,992,140 | A | 11/1999 | Hammond et al. |
| 6,016,651 | A | 1/2000 | Hammond et al. |
| 6,122,907 | A | 9/2000 | Frawley |
| 6,134,879 | A | 10/2000 | Frawley |
| 6,687,609 | B2 | 2/2004 | Hsiao et al. |
| 6,742,339 | B2 | 6/2004 | Horner |

(Continued)

FOREIGN PATENT DOCUMENTS

GB    2058371 A  *  4/1981 ............. G01G 19/08

OTHER PUBLICATIONS

Supplementary European Search Report, dated Apr. 4, 2011, EP Application No. 06850272.3.

(Continued)

*Primary Examiner* — Behrang Badii
*Assistant Examiner* — Jerrah Edwards
(74) *Attorney, Agent, or Firm* — Carlson, Gaskey & Olds P.C.

(57) ABSTRACT

An aircraft load management system determines a cargo through a wireless communication system to rapidly position the cargo. RFID emitter tags on each piece of cargo are triangulated relative to an aircraft internal cargo bay. Real time cargo position information is displayed to facilitate direction of drivers, loadmasters and aircrew. Cargo data is also relayed to onboard systems for mission planning, and for communication to a global information network to prioritize cargo delivery and dynamic mission re-planning. Even prior to onloading, cargo data is wirelessly communicated to the load management system to automatically plan the cargo load sequence. The load management system also autonomously loads remote controlled ground vehicles and equipment through communication therewith.

22 Claims, 4 Drawing Sheets

(56) References Cited

U.S. PATENT DOCUMENTS

| | | |
|---|---|---|
| 7,003,374 B2 | 2/2006 | Olin et al. |
| 7,030,760 B1 * | 4/2006 | Brown ................ 340/568.1 |
| 7,980,808 B2 * | 7/2011 | Chilson et al. ............ 414/809 |
| 8,185,234 B2 * | 5/2012 | Tietjen et al. ............ 700/219 |
| 2001/0027360 A1 * | 10/2001 | Nakano et al. ............ 701/23 |
| 2002/0099497 A1 | 7/2002 | Godwin et al. |
| 2005/0246132 A1 | 11/2005 | Olin |
| 2006/0038077 A1 * | 2/2006 | Olin et al. ............ 244/137.1 |

OTHER PUBLICATIONS

PCT International Search Report and Written Opinion, mailed Mar. 3, 2008.

* cited by examiner

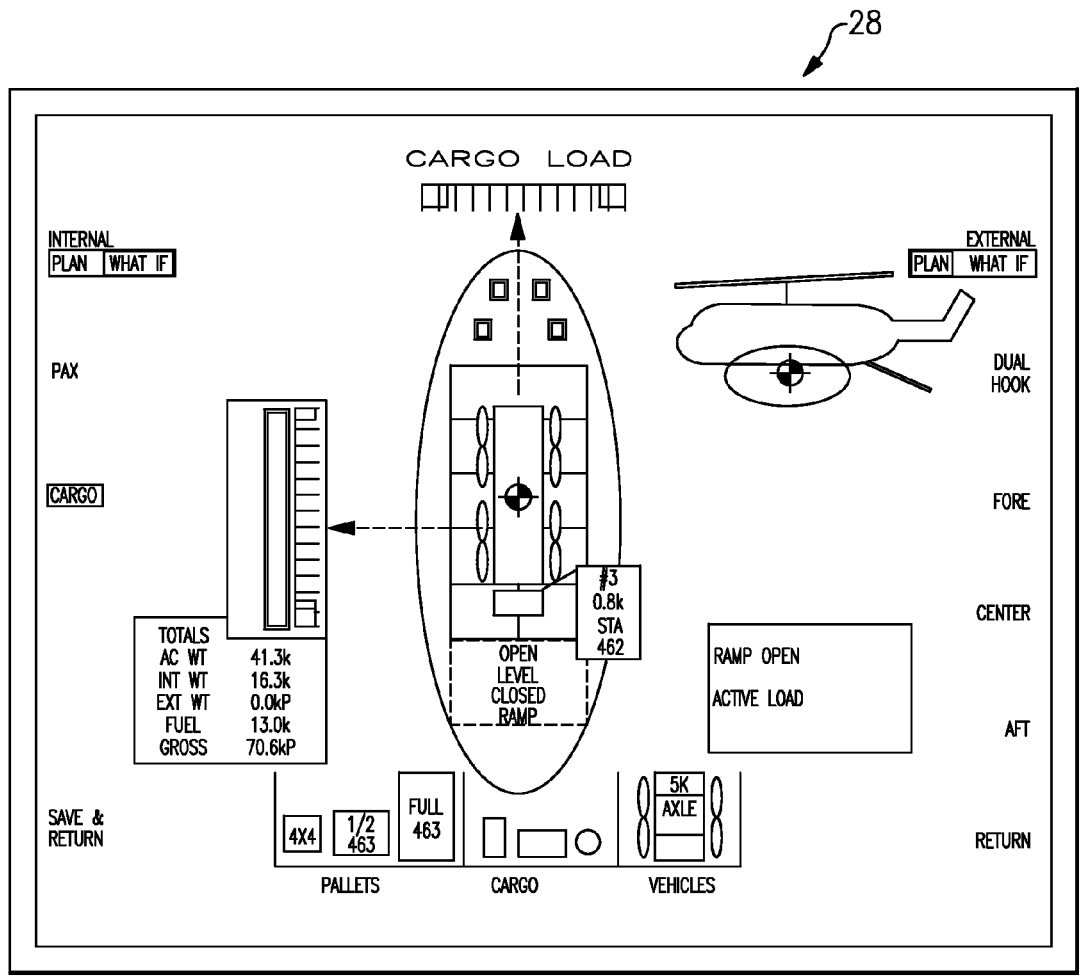
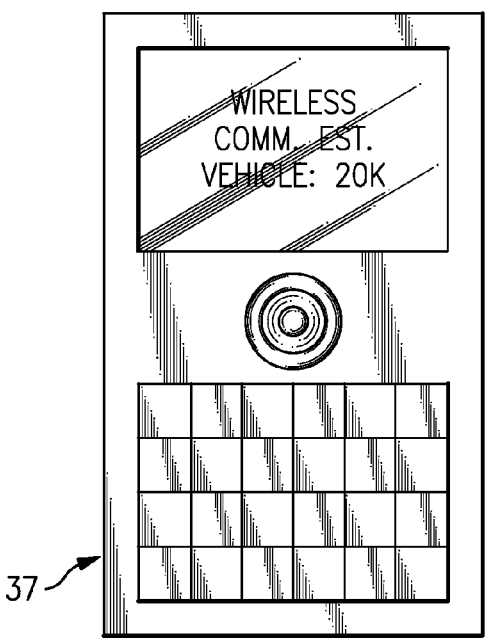
FIG.4

US 8,694,235 B2

AIRCRAFT LOAD MANAGEMENT SYSTEM FOR INTERIOR LOADS

The present invention claims the benefit of U.S. Provisional Patent Application No. 60/777,660, filed Feb. 27, 2006.

BACKGROUND OF THE INVENTION

The present invention relates to a load management system, and more particularly to an aircraft load management system that wirelessly tracks and positions cargo relative an internal cargo bay of the aircraft.

Loading cargo into an aircraft cargo bay may be relatively time consuming and complicated by the relatively small clearances within the aircraft cargo bay. Several crewmembers operate as spotters and communicate with vehicle drivers or ground based equipment operators such as forklift drivers to facilitate position of cargo within the aircraft cargo bay to assure that the cargo is positioned within aircraft center of gravity limits. Furthermore, should the aircraft and cargo place the aircraft's center of gravity out of limits, the cargo has to be relocated until the center of gravity of the aircraft and cargo is within appropriate limits which may be difficult to achieve in certain situations such as combat environments.

Accordingly, it is desirable to automate cargo loading and positioning within the aircraft.

SUMMARY OF THE INVENTION

The present invention provides an aircraft load management system that determines cargo position through a wireless communication system to facilitate loading of the cargo.

The wireless communication system includes a set of emitters such as Radio Frequency Emitter tags ("RFID tags") on the cargo and a multiple of sensors located adjacent an aircraft internal cargo bay. The emitters wirelessly communicate with the sensors such that the load management system calculates the three dimensional position and velocity of the cargo relative the aircraft internal cargo bay through triangulation.

During loading and unloading the real time position of the RFID emitter tags and associated cargo is triangulated relative to the aircraft internal cargo bay such that cargo data from RFID emitter tags are utilized by the aircraft load management system to automate loading, positioning, and securing of the cargo with, for example, active controlled floor rollers and active cargo-locking systems to assure that the aircraft C.G is maintained within predefined limits. Even prior to entering the data from the RFID emitter tags is wirelessly communicated to the load management system to automatically plan the cargo's loading sequence and position.

The real time position data is displayed to assist the aircraft crewmembers and/or drivers of vehicles being loaded onto the aircraft as to where to position and secure the cargo.

The aircraft load management system will also autonomously load remote controlled ground vehicles and equipment through wireless communication therewith.

Wirelessly communicated cargo data is relayed to onboard systems for mission planning and may then be uploaded to the aircraft communication system for upload to a global information network for cargo tracking to provide real time prioritization of cargo delivery or dynamic mission re-planning.

The present invention therefore automates cargo loading and positioning within the aircraft.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows:

FIG. 4 is an internal cargo load planning page displayed by the Load Management System.

DETAILED DESCRIPTION OF THE PREFERRED EMBODIMENT

Figure 1:
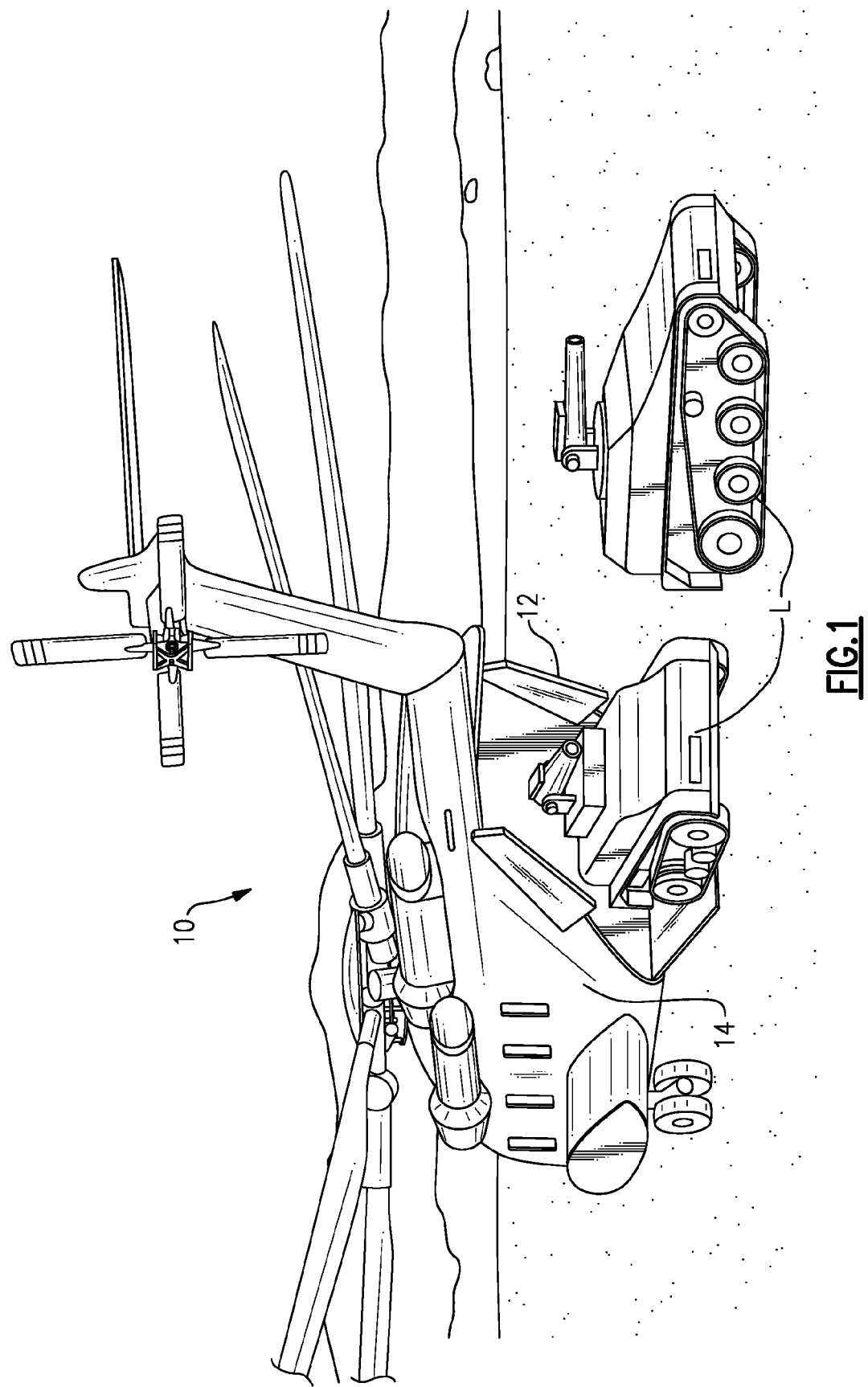
FIG. 1 is a general perspective view of an exemplary with an internal cargo bay to receive cargo such as the example vehicles for use with the present invention.

FIG. 1 schematically illustrates an aircraft 10 having an internal cargo bay 12 defined by a fuselage 14. The aircraft 10 often operates to transport cargo loads L such as vehicles which may be driven in and out of the internal cargo bay 12 as well as other cargo loads which may typically be transported in and out of the internal cargo bay 12 via a forklift, manhandling or such like. Although a particular type of rotary-wing aircraft configuration is illustrated in the disclosed embodiment, other vehicles which carry cargo internally such as ships, ground vehicles, conventional cargo aircraft, helicopters, flying cranes, tilt-rotor and tilt-wing aircraft will also benefit from the present invention.

Figure 2:
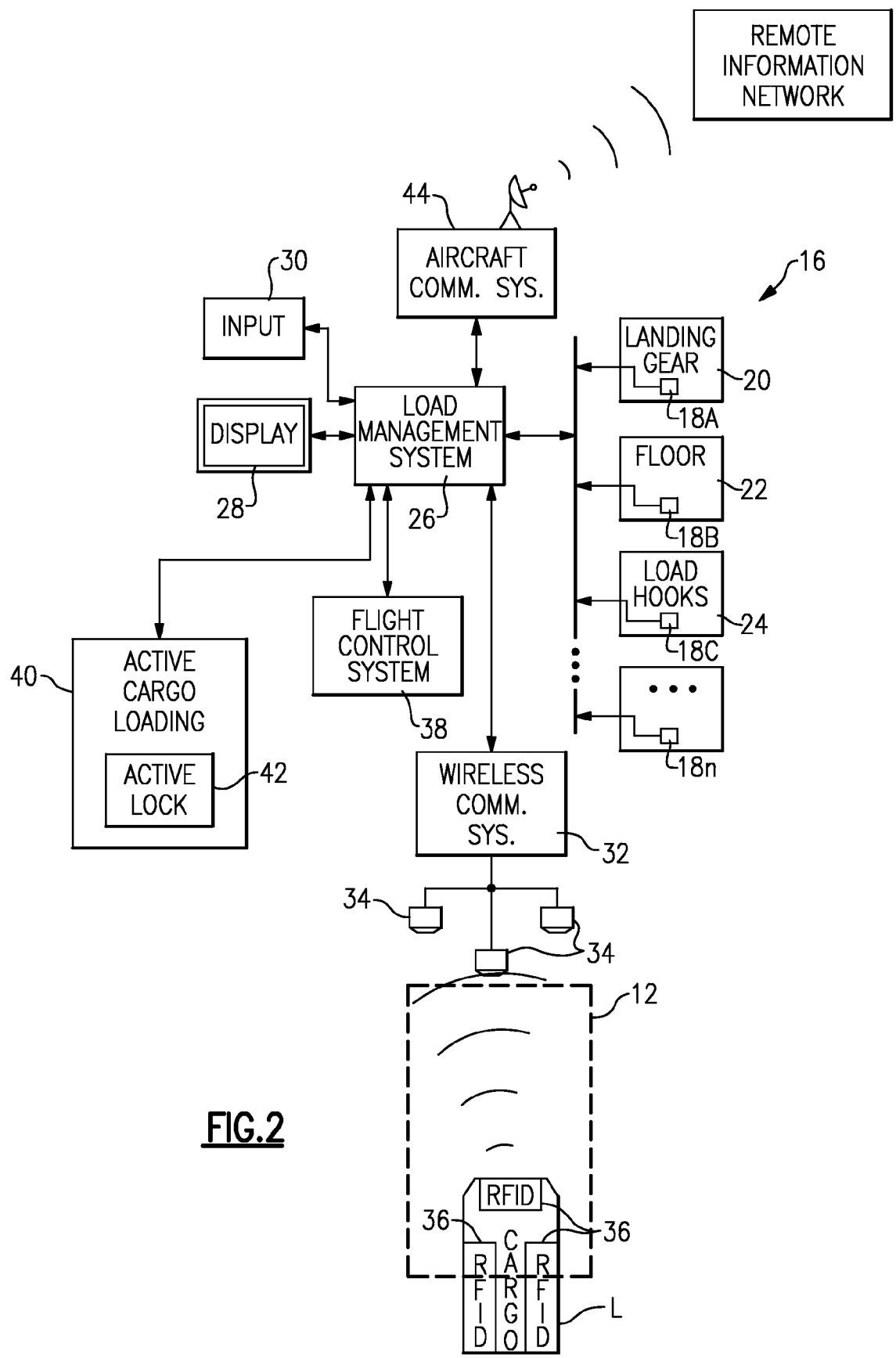
FIG. 2 is a schematic block diagram of a load management system.

Referring to FIG. 2, a sensor system 16 including load sensors 18a-18n are preferably incorporated into the aircraft landing gear 20, the aircraft internal cargo bay floor 22, external cargo hooks 24 as well as other aircraft locations such that load information is relayed to an aircraft Load Management System 26 where software calculates the aircraft's C.G. position for review upon a display 28 such as a multi-function display (MFD) to provide a representation of the fore/aft and lateral load effects on the aircraft C.G. location. An input device 30 such as a keyboard, control grip, mouse, track ball, touch screen, or other such control provides for interaction with the Load Management System 26. It should be understood that the display 28 and input device 30 need not be located only in the aircraft concept and may be located for access by other aircrew members.

For further understanding of other aspects of a load management system and associated components thereof, attention is directed to U.S. patent application Ser. No. 11/455,482 filed Jun. 19, 2006 which is assigned to the assignee of the instant invention and which is hereby incorporated herein in its entirety.

A wireless communication system 32 provides communication between the aircraft load management system 26 and the cargo L such that the load management system 26 will determine a recommended position of the cargo L within the aircraft internal cargo bay 12 to maintain the aircraft's center of gravity within desired limits.

Figure 3:
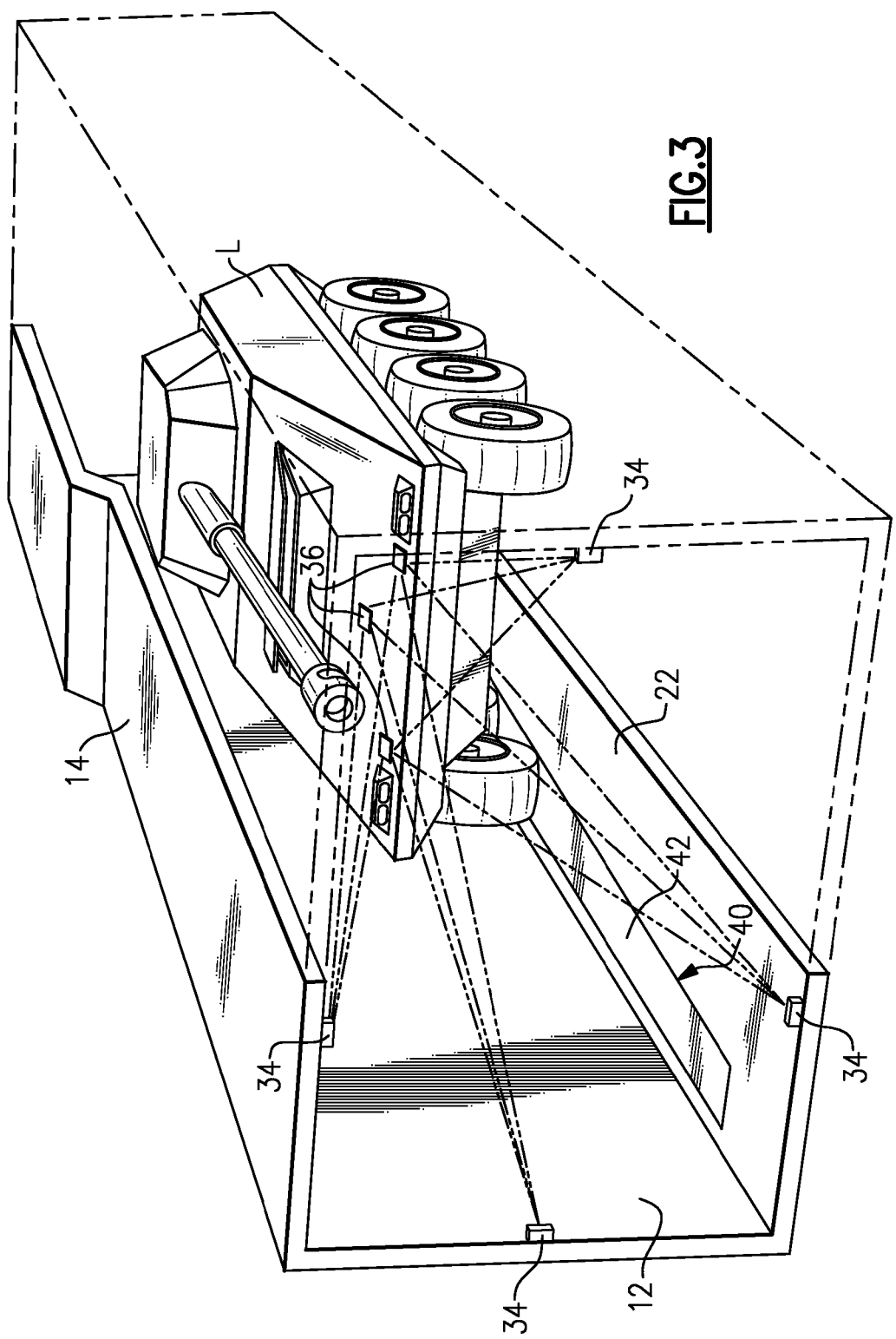
FIG. 3 is a representation of an aircraft internal cargo bay.

The wireless communication system 32 preferably includes emitters 34 such as a passive or active Radio Frequency ("RF") RFID tags within or upon the cargo L and a multiple of sensors 34 located within the internal cargo bay 12 (FIG. 3). It should be understood that various emitters or "tags" will be usable with the present invention and that the system is not limited to only RF communication. The emitters 36 wirelessly communicates with the sensors 34 such that the load management system 26 will calculates the three dimensional position of each piece of cargo L in and out of the internal cargo bay 12 through, for example, triangulation. It should be understood that the sensors 34 may alternatively or additionally be located remote from the aircraft internal cargo bay 12 such as, for example, on the aircraft tail section.

Preferably, the emitters 36 wirelessly communicates with the sensors 34 to transmit cargo data typically stored on the RFID emitter tags on each piece of cargo L. Cargo data may include cargo type, geometric data, cargo weight, cargo destination, exact position of cargo center of gravity (CG), load connection point position, load inertia and the like stored on an RFID emitter tags typical of the DOD distribution chain. The cargo data is preferably directly imported into the load management system 26 even prior to the cargo L being received into the internal cargo bay 12 such that the load management system 26 can determine a proper position of each piece of cargo L prior to on loading. That is, even prior to loading, the cargo data from the RF Emitting tags is utilized to automatically plan the cargo's loading sequence in the aircraft.

The position of each piece of cargo L is preferably displayed to the aircrew through the display 24 to facilitate direction of the vehicle drivers, loadmasters and crew as to where to position and secure the cargo. The display 24 preferably includes various pages such as a Cargo Bay Floor Plan View (FIG. 4) that provides a schematic of the internal cargo area to display the placement of cargo and the cargo type through specific cargo symbology. The Cargo Bay Floor Plan View provides a top down view of the aircraft to provide perspective to the cargo L relative the internal cargo bay 12 and excursion of the aircraft C.G. through display of a Lateral C.G. Scale and a Longitudinal C.G. Scale. It should be understood that various cargo symbols may alternatively or additionally be provided and various other pages such as a cargo list page may also be provided.

Alternatively or in addition thereto, the cargo data is utilized to automate loading, positioning, and securing of the cargo via the load management system 26 with an active controlled floor roller system 40 and an active cargo-locking systems 42 (also schematically illustrated in FIG. 3) within the internal cargo bay floor 22. That is, the load management system 26 operates the active controlled floor roller system 40 and the active cargo-locking system 42 to essentially fully automate cargo onloading and offloading.

Furthermore, with the increasing prevalence of remote controlled ground vehicles and equipment, the load management system 26 autonomously onloads and offloads remote controlled ground vehicles and equipment through the wireless communication system 32. That is, the wireless communication not only determines real time position of the remote controlled vehicles and equipment, but also wirelessly communicates control commands to remotely operate the vehicles and equipment to control movement thereof.

The load management system 26 also preferably uploads the cargo data and position directly to the flight control system 38 to incorporate any change in aircraft CG due to the cargo L into the flight control system 38 and thus improve aircraft control and stability.

The cargo data is also selectively uploadable through the aircraft communication system 44 and made available to a global information network for cargo tracking to provide real time prioritization of cargo delivery or dynamic mission re-planning.

Although the prior discussion has focused on RF-type emitter tags and sensors, it should be noted that other wireless communication systems, such as electromagnetic, light, IR, sound, ultrasonic, etc may likewise be usable herewith.

It should be understood that relative positional terms such as "forward," "aft," "upper," "lower," "above," "below," and the like are with reference to the normal operational attitude of the vehicle and should not be considered otherwise limiting.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A system to manage a load relative to an internal cargo bay, comprising:
   a wireless communication system adjacent to an internal cargo bay, said wireless communication system comprises a sensor system adjacent the internal cargo bay to wirelessly communicate with and gather information from cargo external to the internal cargo bay prior to loading the cargo, and to wirelessly communicate with and gather information from cargo within the internal cargo bay; and
   a load management system in communication with said wireless communication system to determine a cargo position relative to the internal cargo bay.

2. The system as recited in claim 1, wherein said sensor system comprises a multiple of sensors operable to determine a three dimensional cargo position.

3. The system as recited in claim 1, wherein said wireless communication system is in communication with said sensor system to determine a three dimensional cargo position of the cargo within said internal cargo bay and external to said internal cargo bay.

4. The system as recited in claim 1, wherein said load management system is operable to determine a cargo position within the aircraft internal cargo while the cargo is external to the internal cargo bay, the cargo position determined to maintain an aircraft C.G. within a predefined limit.

5. The system as recited in claim 1, further comprising a display in communication with said load management system, said display operable to display symbology which represents the cargo relative a Cargo Bay Floor Plan View representative of the position of the cargo relative to the internal cargo bay.

6. The system as recited in claim 1, wherein said load management system is an aircraft load management system for a rotary-wing aircraft.

7. The system as recited in claim 6, wherein said wireless communication system comprises at least one sensor mounted external to and remote from said internal cargo bay.

8. The system as recited in claim 1, further comprising an active controlled floor roller system in communication with said load management system.

9. The system as recited in claim 8, further comprising an active cargo-locking system within said active controlled floor roller system.

10. A method of managing an aircraft load for an aircraft with an internal cargo bay comprising:

(A) wirelessly communicating with a set of emitters attached to, and gathering information from, cargo external to said internal cargo bay and within said internal cargo bay;

(B) calculating a three-dimensional position of the cargo within the internal cargo bay and external to the internal cargo bay with a load management system; and (C) displaying symbology representing the cargo relative to a Cargo Bay Floor Plan View of the aircraft in response to said step (B).

11. The method as recited in claim 10, further comprising:
(D) determining an aircraft cargo arrangement to maintain an aircraft C.G. within a predefined limit.

12. The method as recited in claim 11, wherein said step (D) further comprising the steps of:
(a) determining a position within the internal cargo bay for the cargo while the cargo is external to the internal cargo bay.

13. The method as recited in claim 12, wherein said step (a) further comprises:
(i) moving the cargo along an active controlled floor roller system in communication with the load management system; and
(ii) locking the cargo with an active cargo-locking system at the position within the internal cargo bay after said step (i).

14. The method as recited in claim 12, wherein said step (a) further comprising:
(i) wirelessly detecting a set of emitters attached to each of a plurality of cargo pieces; and
(ii) determining a position within the aircraft for each of the plurality of cargo pieces prior to the cargo being loaded within the internal cargo bay.

15. The method as recited in claim 10, further comprising:
(D) wirelessly communicating with a remote control vehicle as the cargo, and
(E) controlling movement of the remote control vehicle relative to the internal cargo bay in response to said step (D) through the load management system.

16. The method as recited in claim 15 wherein said step (D) further comprising:
(a) triangulating a three dimensional cargo position of the cargo relative to the internal cargo bay.

17. The method as recited in claim 15 wherein said step (D) further comprising:
(a) triangulating a three dimensional cargo position of the cargo within the internal cargo bay.

18. The method as recited in claim 10, further comprising:
(D) communicating cargo data from the set of emitters attached to the cargo to the load management system.

19. The system as recited in claim 1, wherein said wireless communication system is in communication with said sensor system to determine a three dimensional cargo position of the cargo external to said cargo bay.

20. The system as recited in claim 19, wherein said cargo is stationary when the position is measured.

21. The system as recited in claim 1, wherein said sensor system adjacent the internal cargo bay is to wirelessly communicate with stationary cargo external to the internal cargo bay, and the stationary cargo is entirely outside the internal cargo bay.

22. The system as recited in claim 1, wherein said wireless communication system comprises at least one sensor mounted to aircraft landing gear, at least one sensor mounted to an aircraft tail, or both.

* * * * *